(12) United States Patent
Fahrenbach

(10) Patent No.: US 10,367,382 B2
(45) Date of Patent: Jul. 30, 2019

(54) LAMINATED CORE OF A STATOR OR A ROTOR AND ELECTRICAL MACHINE

(71) Applicant: Schuler Pressen GmbH, Göppingen (DE)

(72) Inventor: Jürgen Fahrenbach, Aichelberg (DE)

(73) Assignee: Schuler Pressen GmbH, Göppingen (DE)

( * ) Notice: Subject to any disclaimer, the term of this patent is extended or adjusted under 35 U.S.C. 154(b) by 201 days.

(21) Appl. No.: 15/502,233

(22) PCT Filed: Jul. 17, 2015

(86) PCT No.: PCT/EP2015/066487
§ 371 (c)(1),
(2) Date: Feb. 7, 2017

(87) PCT Pub. No.: WO2016/020174
PCT Pub. Date: Feb. 11, 2016

(65) Prior Publication Data
US 2017/0229929 A1    Aug. 10, 2017

(30) Foreign Application Priority Data

Aug. 7, 2014  (DE) .................. 10 2014 111 239

(51) Int. Cl.
*H02K 16/02*    (2006.01)
*H02K 1/14*    (2006.01)
(Continued)

(52) U.S. Cl.
CPC ................. *H02K 1/14* (2013.01); *H02K 1/02* (2013.01); *H02K 1/06* (2013.01); *H02K 1/24* (2013.01);
(Continued)

(58) Field of Classification Search
CPC .. H02K 1/14; H02K 1/24; H02K 1/02; H02K 1/06; H02K 2213/03; H02K 1/265;
(Continued)

(56) References Cited

U.S. PATENT DOCUMENTS

| | | |
|---|---|---|
| 5,093,596 A | 3/1992 | Hammer |
| 5,603,155 A | 2/1997 | Satomi |

(Continued)

FOREIGN PATENT DOCUMENTS

| | | |
|---|---|---|
| CH | 196052 A | 2/1938 |
| CN | 1106172 A | 8/1995 |

(Continued)

OTHER PUBLICATIONS

International Search Report in corresponding International Application No. PCT/EP2015/066487, dated Jun. 16, 2016, 8 pages.
(Continued)

*Primary Examiner* — Donghai D Nguyen
(74) *Attorney, Agent, or Firm* — Fitch, Even, Tabin & Flannery LLP

(57) ABSTRACT

A laminated core can be contained in a rotor and/or in a stator and include at least one first sheet metal part assembly and at least one second sheet metal part assembly. The two sheet metal part assemblies are arranged alternately lying one against the other in a stacking direction. Every first sheet metal part has first teeth projecting from a connecting part radially relative to the axis of rotation. Correspondingly, every second sheet metal part has second teeth projecting from a second connecting part. The first teeth extend from the axis of rotation at a distance different from how far the second teeth extends from the axis of rotation to form a step to mesh the rotor with an associated stator and increase the air gap between them without increasing dimensions of the laminated cores in the stacking direction.

17 Claims, 7 Drawing Sheets

(51) Int. Cl.
*H02K 1/06* (2006.01)
*H02K 1/02* (2006.01)
*H02K 1/24* (2006.01)
H02K 1/16 (2006.01)
H02K 1/26 (2006.01)
B21D 28/22 (2006.01)

(52) U.S. Cl.
CPC .............. *B21D 28/22* (2013.01); *H02K 1/165* (2013.01); *H02K 1/265* (2013.01); *H02K 2201/03* (2013.01); *H02K 2213/03* (2013.01); *Y10T 29/49012* (2015.01)

(58) Field of Classification Search
CPC .... H02K 1/165; H02K 2201/03; B21D 28/22; Y10T 29/49012; Y10T 29/49073
USPC .................... 29/598, 606; 310/112, 114, 195
See application file for complete search history.

(56) References Cited

U.S. PATENT DOCUMENTS

| | | | |
|---|---|---|---|
| 5,627,418 A | 5/1997 | Satomi | |
| 6,000,119 A | 12/1999 | Neuenschwander et al. | |
| 6,998,747 B2 * | 2/2006 | Kujirai | G01D 3/10 310/112 |
| 2004/0245883 A1 | 12/2004 | Mitcham et al. | |
| 2011/0169368 A1 | 7/2011 | Tsumagari | |
| 2012/0262158 A1 | 10/2012 | Matsuura et al. | |
| 2013/0026874 A1 * | 1/2013 | Kondou | H02K 1/16 310/195 |
| 2013/0214637 A1 | 8/2013 | Hill et al. | |

FOREIGN PATENT DOCUMENTS

| | | |
|---|---|---|
| CN | 1108015 A | 9/1995 |
| CN | 101588092 A | 11/2009 |
| CN | 102130557 A | 7/2011 |
| CN | 102684450 A | 9/2012 |
| CN | 102835004 A | 12/2012 |
| DE | 102012021209 A1 | 4/2014 |
| EP | 0482321 A1 | 4/1992 |
| EP | 2555389 A1 | 2/2013 |
| JE | 102012213239 A1 | 1/2014 |
| WO | 96/28241 A1 | 9/1996 |

OTHER PUBLICATIONS

Chinese Office Action and Search Report dated Aug. 31, 2018, for Chinese Application No. 201580042207.8, with English Translation (21 pgs.).

Chinese Office Action, dated Apr. 28, 2019, in corresponding Chinese Application No. 201580042207.8 (4 pgs.).

* cited by examiner

LAMINATED CORE OF A STATOR OR A ROTOR AND ELECTRICAL MACHINE

CROSS REFERENCE TO RELATED APPLICATIONS

This patent application is the national phase of PCT/EP2015/066487 filed Jul. 17, 2015, which claims the benefit of German Patent Application No. 10 2014 111 239.3 filed Aug. 7, 2014.

TECHNICAL FIELD

The invention relates to a laminated core which is formed of a plurality of sheet metal parts and which can be part of a stator or a rotor. The invention also relates to an electrical machine having a stator and a rotor, wherein the stator and/or the rotor comprise/comprises a laminated core formed of a plurality of sheet metal parts. The rotor can rotate about an axis of rotation (rotor of an electrical machine operating in a rotary manner) or, in the case of an electrical machine operating in a translatory manner, can move linearly along the stator.

BACKGROUND

In the case of electrical machines it is known to provide laminated cores for the stator and/or the rotor. Such laminated cores consist of a plurality of sheet metal parts, which are connected to one another, for example by combined stamping and lamination, or by adhesive bonding, or the like.

Each sheet metal part has a connecting part, from which a plurality of teeth extend. For an electrical machine operating in a rotary manner, the connecting part is closed in a peripheral direction as an annular part around an axis of rotation. The teeth extend radially relative to the axis of rotation from the connecting part either outwardly or inwardly to a free end. In the case of an electrical machine operating in a translatory manner, in which the rotor moves in translation over a path of movement along the stator, the connecting part preferably extends in a straight line or also in a curved manner along the path of movement of the rotor, and the teeth extend preferably at a right angle relative to the direction of movement of the rotor from the connecting part to a free end and in particular are oriented parallel to one another.

Many attempts have already been made to improve the efficiency of electrical machines by optimisation of the sheet metal parts or the laminated cores produced from the sheet metal parts By way of example, DE 10 2012 213 239 A1 proposes using two different types of sheet metal parts and stacking these sheet metal parts one above the other in the laminated core. The different types of sheet metal parts are produced here from different materials. By way of example, sheet metal parts made of different materials can thus be arranged alternately in the laminated core. One sheet metal part can consist of a nickel-iron alloy, and the other sheet metal part can consist of an iron-cobalt alloy. Sheet metal parts having on the one hand a low loss factor and having on the other hand a high saturation flux density are thus combined to form a laminated core. Proceeding from this prior art, the object of the present invention is to create a laminated core with which an electrical machine can be improved.

SUMMARY

In accordance with the invention, the laminated core of a stator or of a rotor has a plurality of first sheet metal parts and a plurality of second sheet metal parts. The sheet metal parts for an electrical machine operating in a rotary manner have a connecting part, which is closed in the peripheral direction around an axis of rotation, and a plurality of teeth, which extend radially relative to the axis of rotation from the connecting part to a free end. The sheet metal parts for an electrical machine operating in a translatory manner have a connecting part extending in a straight line or also in a curved manner along the path of movement of the rotor, and the teeth extend away from the connecting part preferably at a right angle relative to the path of movement of the rotor.

The first sheet metal parts have a first connecting part and first teeth, and the second sheet metal parts have a second connecting part and second teeth. A reference plane or reference axis is provided parallel to or along or coaxially with the direction of extension of the corresponding connecting part. For an electrical machine operating in a rotary manner, the axis of rotation can be used as a reference axis. For an electrical machine operating in a translatory manner, a reference axis is provided for example at any point of the path of movement of the rotor and runs through the connecting part(s) of the laminated core at a right angle relative to the path of movement, wherein these reference axes define a reference plane.

The free ends of the first teeth of the first sheet metal parts have a first distance from the reference axis or the reference plane, whereas the free ends of the second teeth of the second sheet metal parts have a second distance from the reference axis or the reference plane, which second distance is different from the first distance. By stacking the first and second sheet metal parts in the laminated core, a laminated core can thus be formed, wherein the end faces formed by the free end of the first and second teeth have two or more end face portions arranged offset from one another relative to the reference axis or the reference plane. When the axis of rotation of the laminated core for an electrical machine operating in a rotary manner is used as reference axis, the end face portions are offset radially relative to the axis of rotation. The end face portions form steps so to speak as considered in the direction of the axis of rotation. When the reference plane of the laminated core for an electrical machine operating in a translatory manner extends through the connecting parts of the laminated core, the end face portions form steps parallel to this reference plane and considered at a right angle relative to the path of movement of the rotor.

A direction in which the sheet metal parts are stacked in order to form the laminated core is referred to as the stacking direction. In the case of a laminated core for an electrical machine operating in a rotary manner, the stacking direction runs parallel to the axis of rotation. For an electrical machine operating in a translatory manner, the stacking direction runs at a right angle relative to the direction of extension of the teeth and at a right angle relative to the path of movement of the rotor. The stacking direction is thus parallel to the reference plane.

This stepped contour is formed in that at least one first sheet metal part assembly is provided, which comprises at least one first sheet metal part, and at least one second sheet metal part assembly is provided, which comprises at least one second sheet metal part. The at least one first sheet metal part assembly and the at least one second sheet metal part assembly are arranged alternately in succession in a stacking direction. Since the free ends of the first teeth of the first sheet metal part assembly have a different distance from the reference axis or the reference plane compared to the free end of the second teeth of the second sheet metal part assembly, the described end face in the laminated core has a plurality of steps on account of the stacked first and second teeth.

Due to such an embodiment of the end faces in the laminated core, the length of the air gap between a laminated core of the stator and a laminated core of the rotor can be increased without having to increase the overall length of the laminated cores in the stacking direction. With a predefined maximum flux density of the magnetic field in the air gap, the magnetic flux can therefore be increased on account of the longer air gap. If, by way of example, an electric motor operating in a rotary or translatory manner is produced with such a laminated core, a greater torque can be achieved with the same overall size.

The first and second sheet metal parts lying against one another are preferably electrically insulated with respect to one another at each bearing point, for example by means of a lacquer or another coating. Eddy currents can thus be reduced.

The laminated core advantageously comprises a plurality of first and/or second sheet metal part assemblies. It is also advantageous when each first sheet metal part assembly comprises a plurality of first sheet metal parts and/or each second sheet metal part assembly comprises a plurality of second sheet metal parts.

At least a number of the provided first sheet metal parts can each have a first thickness. In a preferred exemplary embodiment, the second sheet metal parts each have a second thickness such that the thickness of the second sheet metal parts is the same. By contrast, it is also possible to provide second sheet metal parts having different thicknesses in one or more second sheet metal part assemblies.

The first thickness of the first sheet metal parts and the second thickness of the second sheet metal parts are preferably the same. It is also possible to select the value of the first thickness and the value of the second thickness to be different.

In an advantageous exemplary embodiment a number of first sheet metal parts having a third thickness is provided. The third thickness is preferably greater than the first thickness of the other first sheet metal parts. The first sheet metal parts of different thickness can be provided in a common sheet metal part assembly.

Instead of a sheet metal part of greater thickness, it is also possible to lie two or more sheet metal parts of smaller thickness against one another without electrical insulation. The production can be simplified as a result.

In a preferred exemplary embodiment one or each first sheet metal part assembly comprises a plurality of first sheet metal parts, wherein two of the first sheet metal parts form outer sheet metal parts and at least one further first sheet metal part forms an inner sheet metal part, which is arranged between the two outer sheet metal parts. The stack of the first sheet metal parts of this first sheet metal part assembly consequently comprises two outer sheet metal parts as considered in the stacking direction, between which an inner sheet metal part or a plurality of inner sheet metal parts is/are arranged.

The inner sheet metal parts in one exemplary embodiment have a first thickness, whereas at least one of the two outer sheet metal parts has a third thickness, which is greater than the first thickness. As mentioned, it is also possible, instead of the thicker sheet metal part, to also connect a plurality of inner sheet metal parts to one another without electrical insulation. Due to this greater third thickness of at least one outer sheet metal part, the entry of magnetic field lines into a side face portion of the first teeth of the outer sheet metal part oriented at a right angle relative to the stacking direction is improved.

It is also advantageous when not all sheet metal parts of a laminated core are produced from the same material, but instead a number of the provided sheet metal parts are produced from one material and a number of the provided sheet metal parts are produced from another material. In particular, a sheet metal part assembly can also contain both sheet metal parts made of one material and sheet metal parts made of another material.

In a preferred exemplary embodiment at least one outer sheet metal part of the first sheet metal part assembly consists of a first material, and the at least one inner sheet metal part of the first sheet metal part assembly consists of another, second material The materials used for the sheet metal parts are preferably magnetically soft. In any case, they are magnetisable materials.

The first material, which in particular is used to produce the outer sheet metal parts of a first sheet metal part assembly, preferably has a greater saturation magnetisation than the second material, which is used for other sheet metal parts of the laminated core. By way of example, an iron alloy having a fraction of at least 45% or at least 50% cobalt can be used as first material. Iron alloys with nickel fractions and/or molybdenum fractions can also be used.

What are known as "Mu metals" or iron alloys with nickel constituents and/or silicon constituents are preferably used as second material.

The first material preferably has a saturation magnetisation which is at least 2.0 T or 2.3 T or 2.5 T or 3.0 T. The saturation magnetisation of the second material is preferably at most 1.0 T. In a preferred exemplary embodiment the relative permeability of the first material is lower than that of the second material. By way of example, the first material has a relative permeability of at most 20,000. The relative permeability of the second material can be at least 30,000, and in one exemplary embodiment can lie in a range from 100,000 to 200,000.

In a further exemplary embodiment it is also possible to divide a first sheet metal part and/or a second sheet metal part into a number of segments and to produce each of the segments from a material, in particular the first or the second material. In particular, at least one tooth head segment of a first or a second tooth, which preferably comprises at least part of the free end of the tooth, can be produced from the second material. The segment of the tooth adjacent to the at least one tooth head segment can be produced by way of example from the second material. By way of example, apart from the at least one tooth head segment of each tooth, the entire remaining part of the sheet metal part in question can be produced from a material other than the first material, and for example can be produced from the second material.

The volume fraction of the first material in the laminated core is preferably smaller than the volume fraction of the second material, which results in a significant cost advantage.

A free space that is closed annularly in the direction of movement of the rotor is advantageously formed between two first sheet metal part assemblies adjacent in the stacking direction. When the laminated core belongs to a rotor, protrusions of a stator protruding at a right angle relative to the stacking direction and relative to the direction of movement of the rotor can engage in this free space. When the laminated core belongs to a stator, protrusions of a rotor protruding at a right angle relative to the stacking direction and relative to the direction of movement of the rotor can engage in this free space.

In all embodiments the first teeth extend further from the corresponding connecting part than the second teeth.

When the laminated core is provided for an electrical machine operating in a rotary manner, the following possibilities exist: In one exemplary embodiment the first and the second teeth extend radially outwardly away from the axis of rotation, starting from the connecting part. In this case, the first distance can be greater than the second distance, such that the free ends the first teeth have a greater distance from the axis of rotation than the free ends of the second teeth. Alternatively, the first and the second teeth can extend radially inwardly towards the axis of rotation, starting from the connecting part. Here, the first distance can be shorter than the second distance, such that the free ends of the first teeth are arranged closer to the axis of rotation than the free ends of the second teeth.

With the aid of a laminated core of this type, an electrical machine can be produced. The rotor and/or the stator of an electrical machine of this type can comprise a laminated core of the type described above. Here, the first teeth of a first sheet metal part assembly of the rotor preferably each project into a free space between two first sheet metal part assemblies of the stator and/or the first teeth of a first sheet metal part assembly of the stator each project into a free space between two sheet metal part assemblies of the rotor.

In an advantageous exemplary embodiment of the electrical machine, a first sheet metal part assembly of the rotor, as considered at a right angle relative to the stacking direction, faces a second sheet metal part assembly of the stator and/or a first sheet metal part assembly of the stator faces a second sheet metal part assembly of the rotor.

The following approach can be adopted in order to produce the first and/or the second sheet metal part:

The first and/or second sheet metal parts are separated from a starting sheet metal. The separation can be implemented by cutting, stamping, laser cutting, water jet cutting, or the like. If a sheet metal part consists of a plurality of segments, which in turn are produced from different materials, the segments in question are stamped out from the respective starting sheet metals and are then connected to one another in an integrally bonded manner and/or in a frictionally engaged manner and/or in a form-fitting manner.

In a further exemplary embodiment, some of the first and/or second sheet metal parts of the laminated core and preferably the outer sheet metal parts of the first sheet metal part assembly can be altered in terms of their structure, at least in the portion which borders the air gap between rotor and stator with use in an electrical machine. It is possible for specific areas and the Weiss domains present there to be tempered so to speak, for example by targeted influence of heat, and for the magnetic properties in these areas to thus be altered. As a result of this measure, the flux density within the sheet metal part in question can be homogenised. The tempering can be implemented for example by feeding heat to defined points with the aid of a laser.

Advantageous embodiments of the invention will emerge from the dependent claims, the description, and the drawings. A preferred exemplary embodiment of the invention will be explained in detail hereinafter on the basis of the accompanying drawings, in which:

DETAILED DESCRIPTION

Figure 12:
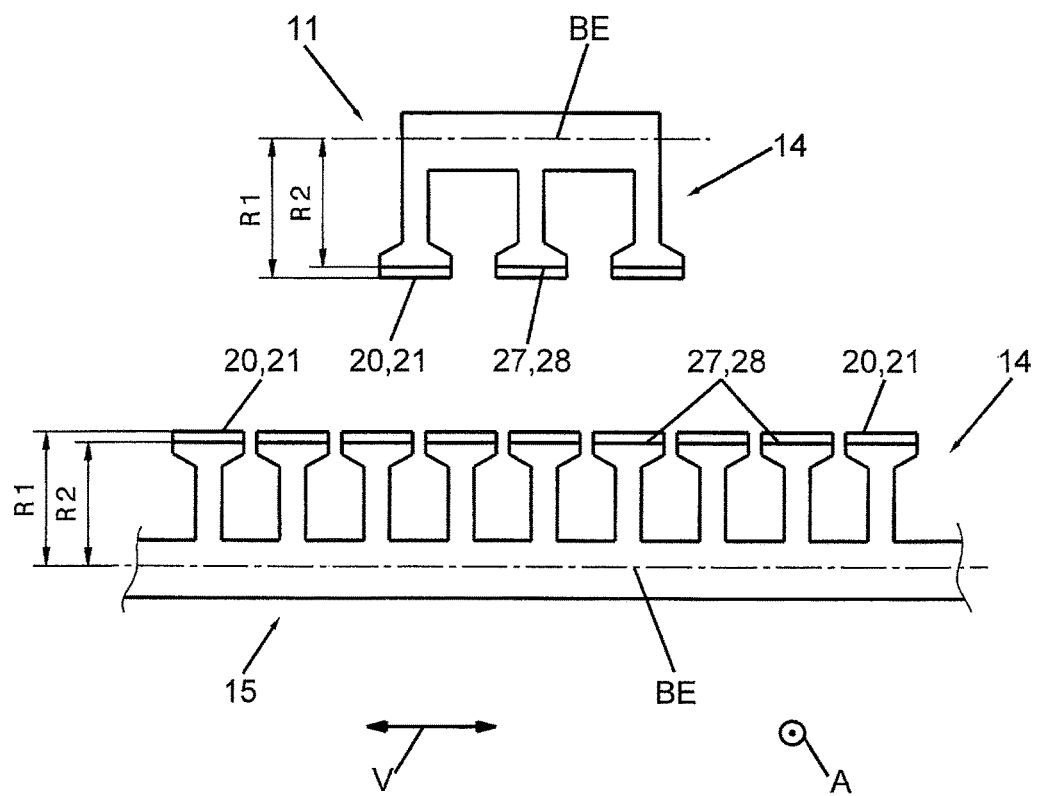
FIG. 12 shows a schematic side view of the laminated cores of a rotor and a stator for an electrical machine operating in a translator manner.

The invention relates to a laminated core 14 which is formed from sheet metal parts 10 and which can be used for a stator 15 or a rotor 11. The stator 15 or the rotor 11 can be used for an electrical machine operating in a rotary manner (FIGS. 1 to 10) or for an electrical machine operating in a translatory manner (FIG. 12). The essential features will be explained hereinafter by way of example with reference to sheet metal parts 10 and laminated cores 14 for an electrical machine operating on a rotary manner. The features according to the invention can be used equally for an electrical machine operating in a translatory manner.

Instead of the sheet metal parts 10 used here by way of example in conjunction with the drawings, sintered parts made of a scented material could also be used alternatively.

Figure 1:
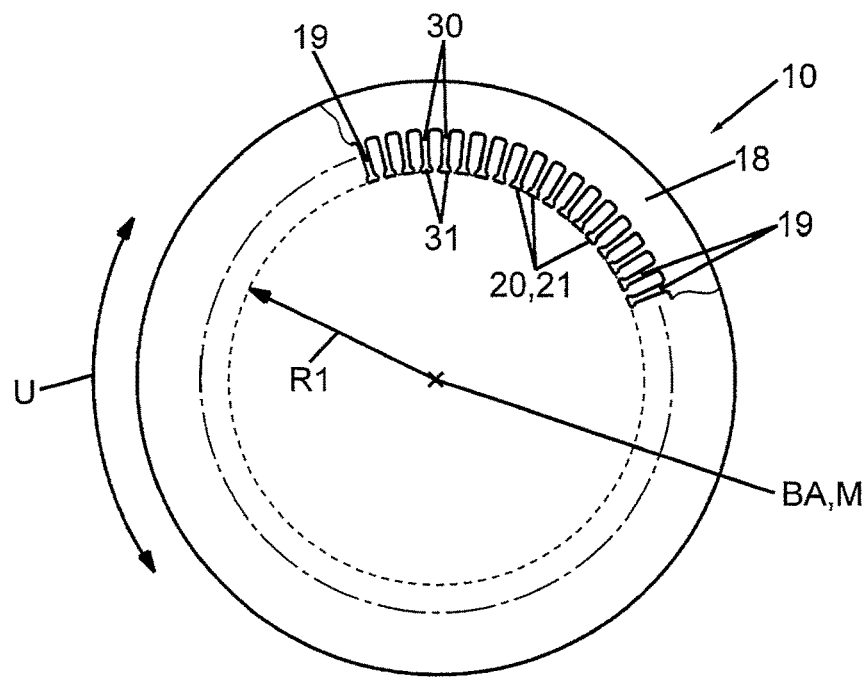
FIG. 1 shows a schematic partial illustration of a first sheet metal part for a rotor, in side view.
Figure 7:
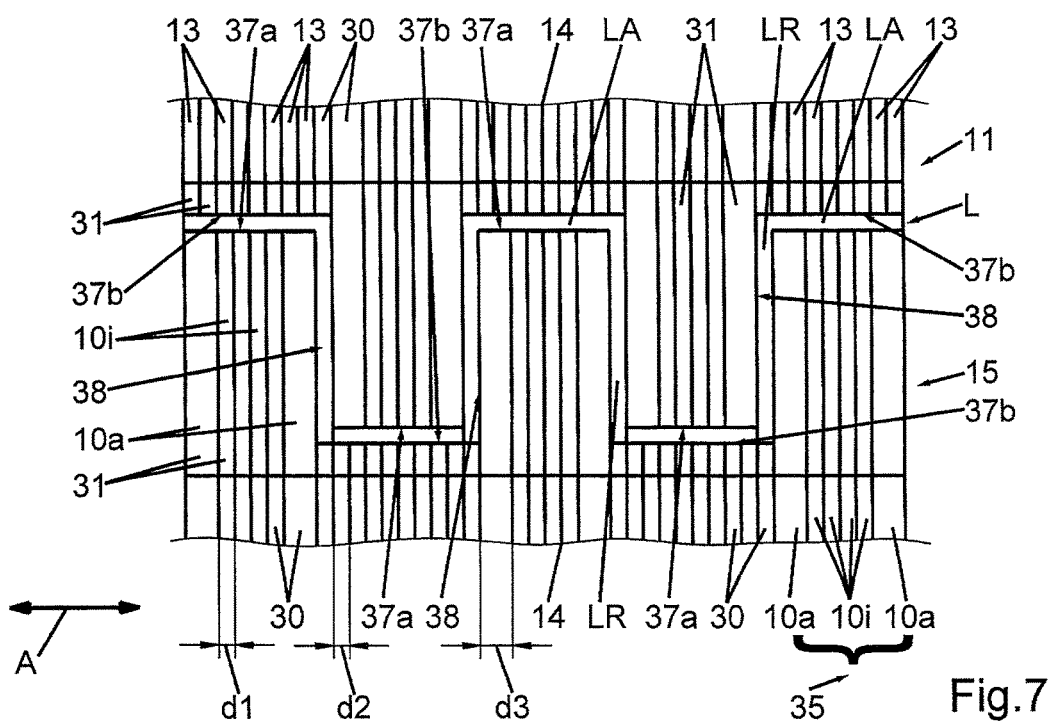
FIG. 7 shows a schematic detailed illustration of the area IIV from FIG. 6, FIGS. 8 to 10 each show a schematic illustration of first teeth or second teeth of a first sheet metal part or a second sheet metal part, in side view, wherein each tooth comprises at least two segments made of different materials.

FIG. 1 shows a schematic partial illustration of a first sheet metal part 10 for a rotor 11 of an electric motor 12 (FIG. 7).

Figure 2:
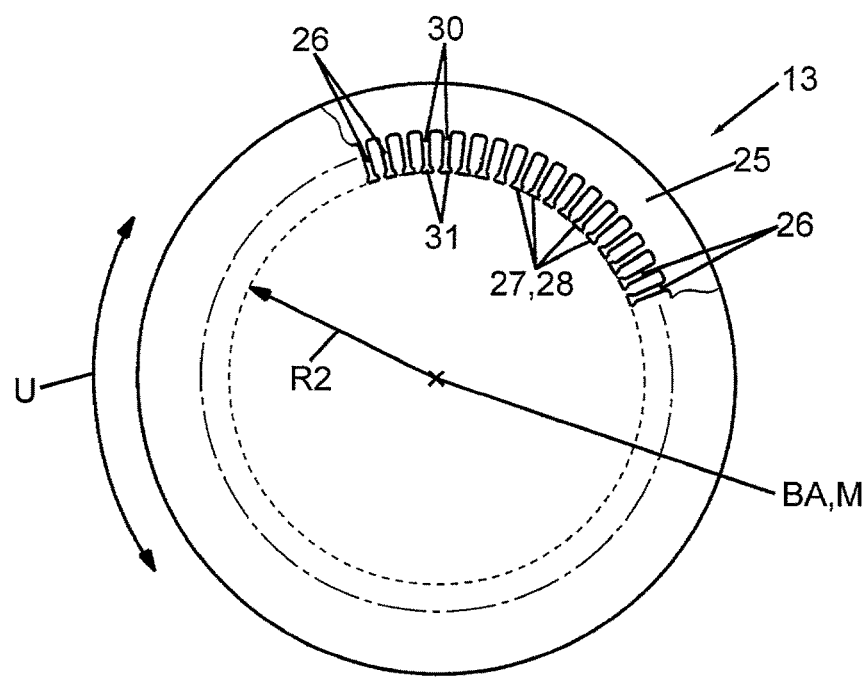
FIG. 2 shows a schematic partial illustration of a second sheet metal part for a rotor, in side view.

FIG. 2 shows a second sheet metal part 13 for this rotor 11. A laminated core 14 is produced from a plurality of first sheet metal parts 10 and a plurality of second sheet metal parts 13. Here, the sheet metal parts 10, 13 are connected by adhesive bonding or by combined stamping and lamination or by other means in order to form the laminated core 14. In the exemplary embodiment explained here, the laminated core 14 of the rotor 11 is arranged radially outwardly around a stator 15, coaxially with an axis of rotation M. The machine is consequently an electrical machine 12 with external rotor. It goes without saying that, in a modification of the example according to FIG. 6, the rotor 11 could also be arranged radially inside the stator 15.

Figure 3:
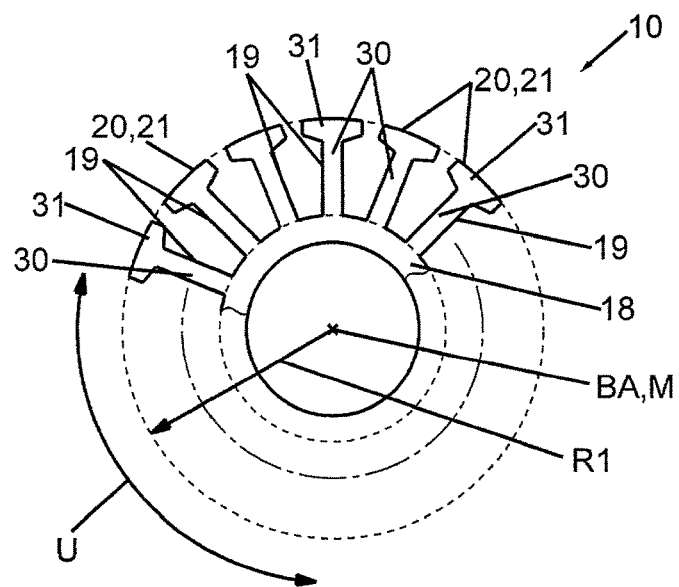
FIG. 3 shows a schematic partial illustration of a first sheet metal part for a stator, in side view.
Figure 4:
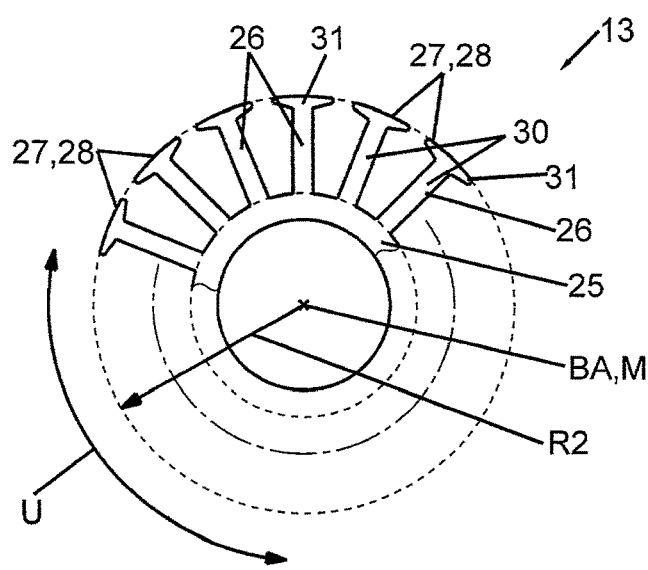
FIG. 4 shows a schematic partial illustration of a second sheet metal part for a stator, in side view.
Figure 6:
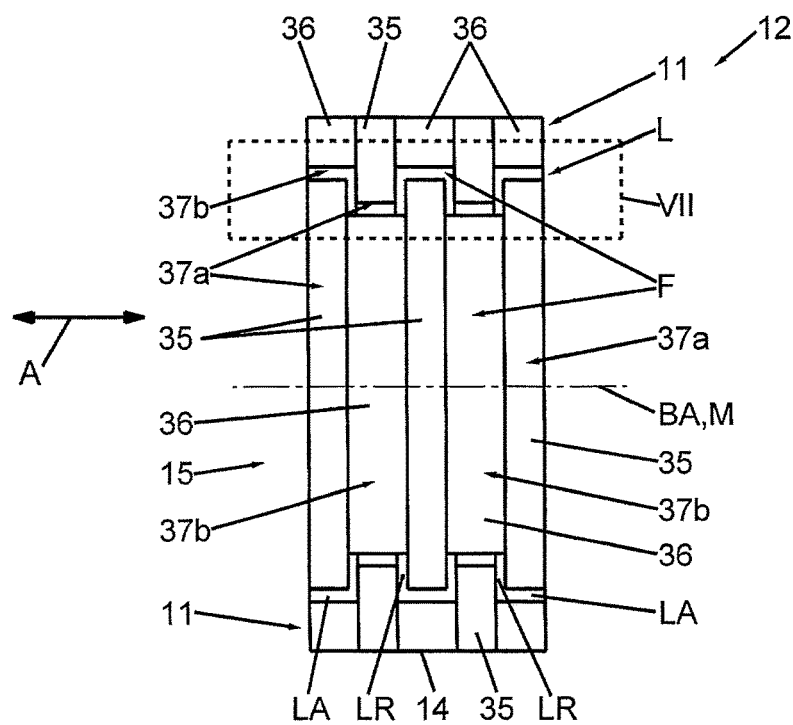
FIG. 6 shows a schematic sectional illustration, similar to a block diagram, through the rotor and the stator of an electrical machine.

The first sheet metal part 10 for the stator 15 from FIG. 6 or the laminated core 14 of the stator 15 is illustrated schematically in FIG. 3, whereas FIG. 4 shows the second sheet metal part 13 for the laminated core 14 of the stator 15.

The first sheet metal part 10 has a first connecting part 18 closed in an annular manner in a peripheral direction U around an axis of rotation D. A plurality of first teeth 19 project radially relative to the axis of rotation M from this first connecting part 18 to a free end 20. At the free end 20, each first tooth 19 has an end edge 21. The free ends 20 or the end edges 21 of the first teeth 19 have a first distance R1 from a reference axis BA, which is formed in accordance with the example by the axis of rotation M. All end edges 21 are preferably disposed on a common circular path or cylinder lateral surface around the reference axis BA or the axis of rotation M, of which the radius corresponds to the first distance R1 (FIGS. 1 and 3).

Accordingly, each second sheet metal part 13 has a second connecting part 25, extending radially relative to the axis of rotation M from the plurality of second teeth 26 to a free end 27. At the free end 27, each second tooth 26 has an end edge 28, which have a second distance R2 from the reference axis BA, i.e. in accordance with the example the axis of rotation M. In the exemplary embodiments described here, the free ends 27 and the end edges 28 of the second teeth 26 of a second sheet metal part 13 are disposed on a common circular path or cylinder lateral surface around the axis of rotation M, the radius of said path or surface corresponding to the second distance R2 (FIGS. 2 and 4).

In the exemplary embodiments illustrated here, the first and second teeth 19, 26 are constructed such that they have a tooth stem 30, which is connected to the associated first or second connecting part 18, 25 respectively. At the end of each tooth 19, 26 opposite the connecting part 18 or 26 respectively, there is provided a tooth head 31, which projects beyond the tooth stem 30 on both sides in the peripheral direction U. The free end 20 or 27 or the corresponding end edge 21 or 28 of a tooth 19 or 26 respectively is disposed at the tooth head 31. It goes without saying that other tooth contours or tooth forms deviating from the illustrated exemplary embodiments can also be used. As a result of the tooth form described here, a free space is formed between two directly adjacent teeth 19 of a first sheet metal part 10 or the directly adjacent second teeth 26 of a second sheet metal part 13, in which free space windings of the stator 15 or rotor 11 can be arranged.

The first and second sheet metal parts 10, 13, which form a common laminated core 14 for a rotor 11 or stator 15, have different first and second distances R1, R2. In the case of a laminated core 14 having teeth 19, 26 projecting radially outwardly from the connecting part 18, 25, the first distance R1 is greater than the second distance R2. Conversely, in the case of a laminated core 14 having teeth 19, 26 projecting radially inwardly from the connecting part 18, 25, the first distance R1 is smaller than the second distance R2.

The structure of a laminated core 14 with teeth projecting radially outwardly will be explained in greater detail on the basis of the stator laminated core 14 according to the example with reference to FIG. 5. A laminated core 14 which has teeth 19, 26 projecting radially inwardly from the connecting part 18 or 25 respectively can be constructed similarly for this purpose.

Figure 5:
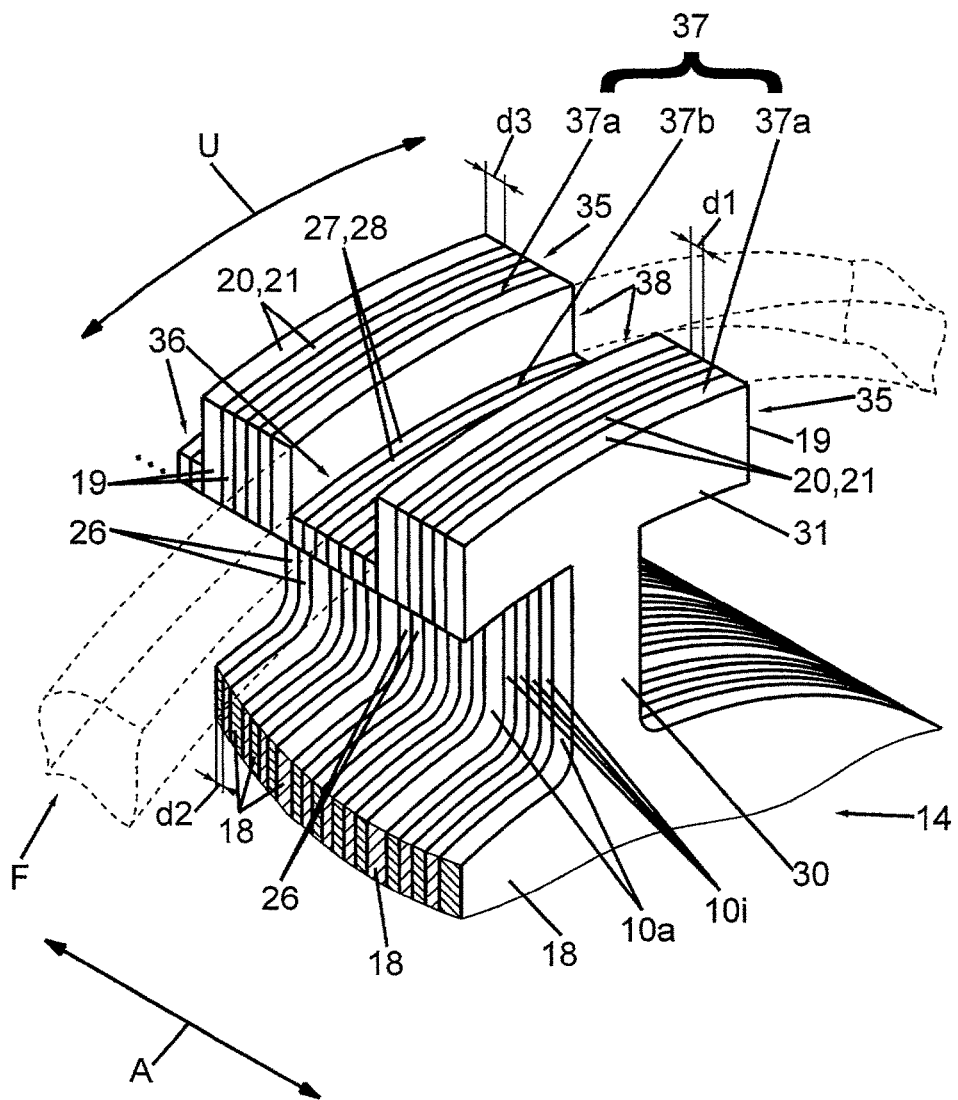
FIG. 5 shows a schematic, perspective illustration of a detail of a laminated core in the area of the teeth of the sheet metal parts or sheet metal part assemblies stacked in the stacking direction, parallel to the axis of rotation.

As is illustrated schematically in FIG. 5, the first sheet metal parts 10 and the second sheet metal parts 13 of the laminated core 14 are stacked in a stacking direction A, which in the exemplary embodiment runs parallel to the axis of rotation M.

As can be seen in FIG. 5, a plurality of first sheet metal parts 10 lying directly against one another in the stacking direction A form a sheet metal part assembly 35. Second sheet metal parts 13 lying directly against one another in the stacking direction A form a second sheet metal part assembly 36. In FIG. 5, two first sheet metal part assemblies 35, a second sheet metal part assembly 36 arranged therebetween, and just part of a further second sheet metal part assembly 36 are illustrated. The number of the first and second sheet metal part assemblies 35, 36 can vary. The number of first and second sheet metal part assemblies 35, 36 of a common laminated core 14 preferably differs by the value 1.

In the exemplary embodiment described here, the first sheet metal part assemblies 35 of the laminated core 14 are constructed identically. The second sheet metal part assemblies 36 of the laminated core 14 are preferably also constructed identically, correspondingly.

The first and second sheet metal part assemblies 35, 36 are always arranged alternately in the stacking direction A. A second sheet metal part assembly 36 is arranged between two adjacent first sheet metal part assemblies 35 in the stacking direction A, or vice versa. On account of the different distances R1, R2 of the free ends 20, 27 or of the end edges 21, 28 of the first teeth 19 and of the second teeth 26, a stepped profile of the laminated core 14, as considered in the stacking direction A, is created at the end faces 37 formed by the end edges 21, 28. The end edges 21 of the first teeth 19 of a first sheet metal part assembly 35 lying directly against one another form a first face portion 37a. Accordingly, the end edges 28 of the second teeth 26 of a second sheet metal part assembly 36 form a second face portion 37b. The number of the first and second face portions 37a, 37b is dependent on the number of provided first and second sheet metal part assemblies 35, 36. The first and second face portions 37a, 37b alternate in the stacking direction A, such that a step 38 is formed in each case between a first face portion 37a and the second face portion 37b directly adjacent thereto. All first and second face portions 37a, 37b of the first and second teeth 19, 26, which lie against one another in the stacking direction A, form the end face 37.

A free space F is formed between two adjacent first sheet metal part assemblies 35 adjacently to the second face portion 37b of the second sheet metal part assembly 36 arranged therebetween, as is indicated schematically in FIGS. 5 and 6. The free space F extends annularly in a closed manner in the peripheral direction U, coaxially with the axis of rotation M. Radial protrusions of another laminated core 14 of the electric machine 12, for example the areas of first teeth 19 of a rotor 15 or stator 11 adjacent to free ends 20, can engage in such a free space F. The engagement with one another of the teeth 19, 26 or of the laminated core 14 of a stator 15 and the laminated core 14 of a rotor 11 is illustrated in FIGS. 6 and 7 in a heavily simplified manner. The peripheral gaps provided in the peripheral direction U between individual teeth 19, 26 are not illustrated there for the sake of clarity.

An essential advantage of the embodiment according to the invention of the laminated cores 14 can be seen on the basis of FIGS. 6 and 7. The air gap L provided between the rotor 11 and the stator 15 has first air gap portions LR running at a right angle relative to the stacking direction A and also second air gap portions LA running parallel to the stacking direction A. A first air gap portion LR is located at each step 38. A second air gap portion LA is formed between the opposing face portions 37a, 37b as considered at a right angle relative to the stacking direction A. Due to the first air gap portions LR provided at the steps 38, a greater overall length of the air gap L is achieved with the same overall size of the laminated core 14 as measured in the stacking direction, the overall length of the air gap being given by the sum of the provided first and second air gap portions LR, LA. When a maximum flux density is provided for the air gap L, a greater magnetic flux can be achieved by the extension or enlargement of the air gap L. By way of example for an electric motor, higher torques can thus be provided with the same overall size.

A laminated core 14 of a rotor 11 and of a stator 15 for an electrical machine operating in a translatory manner is illustrated schematically in FIG. 12. Since no axis of rotation M is provided here as reference axis BA, a reference plane BE is defined and the first distance R1 and the second distance R2 between the free ends 20, 27 of the teeth 19, 26 is determined. The reference plane BE extends in the movement direction V of the rotor 11, which is defined within the reference plane BE at any point of a path of movement of the rotor 11 running in a straight line or in a curved manner. The stacking direction A, which defines the second component of extension of the reference plane BE, extends at a right angle relative to the path of movement or the direction of movement V of the rotor 11. The exact position of the reference plane BE relative to the corresponding laminated core 14 is not decisive, since it is the difference between the distances R1, R2 that is important, rather than the absolute value of said distances. By way of example, the corresponding reference plane BE of a laminated stack 14 can extend through the connecting parts 18, 25.

As can be seen in FIG. 12, the connecting parts 18, 25 of the laminated core 14 of the stator 15 are not closed in an annular manner, but instead extend in a straight line or in a curved manner along the path of movement of the rotor 11. The connecting parts 18, 25 of the laminated core 14 of the rotor 11 preferably run in a straight line. The corresponding teeth 19, 26 project at a right angle from the associated connecting part 18, 25 and extend at a right angle relative to the reference plane BE. The formation of the steps 38 in the stacking direction A (perpendicular to the drawing plane in FIG. 12) corresponds to the illustration in FIG. 7. The features of the sheet metal parts 10 and/or the laminated cores 14 for an electrical machine operating in a rotary manner can also be transferred accordingly to the sheet metal parts 10 and/or the laminated cores 14 illustrated in FIG. 12.

In the exemplary embodiment described here, different first sheet metal parts 10 of a first sheet metal part assembly 35 can be produced from different materials. Accordingly, different second sheet metal parts 13 of a second sheet metal part assembly 36 can also be produced from different materials.

In some exemplary embodiments the first sheet metal parts 10 and the second sheet metal parts 13 each consist of a uniform material.

The first sheet metal parts 10 can consist of a material different to that of the second sheet metal parts 13. In accordance with the example, a number of first sheet metal parts 10 of a first sheet metal part assembly 35 are produced from a first material, and other first sheet metal parts 10 of this first sheet metal part assembly 35 are produced from a second material.

By way of example, an iron alloy comprising fractions of at least 45% or at least 50% cobalt is used as first material. By way of example, an iron alloy having nickel fractions and/or silicon fractions can be used as second material. In principle, what are known as "Mu metals" can be used as second material.

A material which has a higher saturation magnetisation than the second material is preferably used as first material. The saturation magnetisation of the first material can be greater than 2.0 T or 2.5 T or 3.0 T. The saturation magnetisation of the second material is preferably at most 1.0 T.

The relative permeability of the second material is in particular greater than that of the first material. The relative permeability of the second material can be greater than 30,000 for example and can lie in a range of preferably 100,000 to 200,000. Here, the relative permeability of the first material can be less than 20,000.

In a first sheet metal part assembly 35 the first sheet metal parts 10 arranged at the ends in the stacking direction A each form an outer sheet metal part 10a, and the first sheet metal parts 10 arranged therebetween in the stacking direction A form inner sheet metal parts 10i. Each outer sheet metal part 10a is thus bordered on one side thereof by an inner sheet metal part 10i.

In the exemplary embodiment described here, the outer sheet metal parts 10a consist of the first material, whereas the inner sheet metal parts 10i are produced from the second material. The second sheet metal parts 13 can also be produced from this second material.

Figure 8:
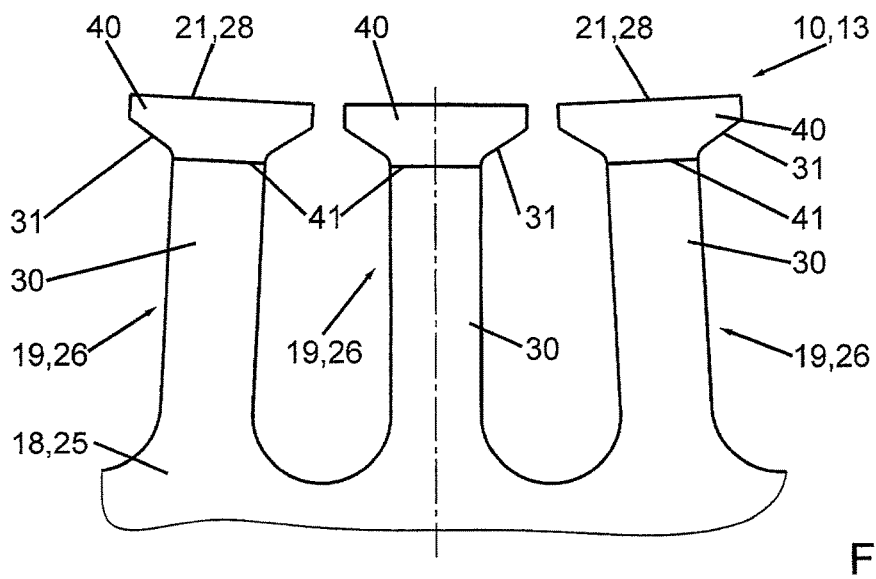
Figure 9:
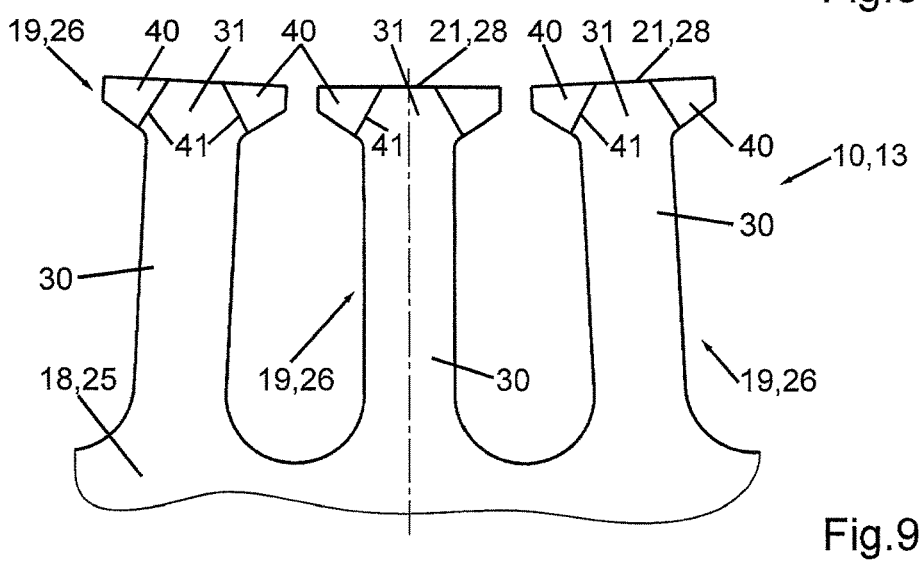
Figure 10:
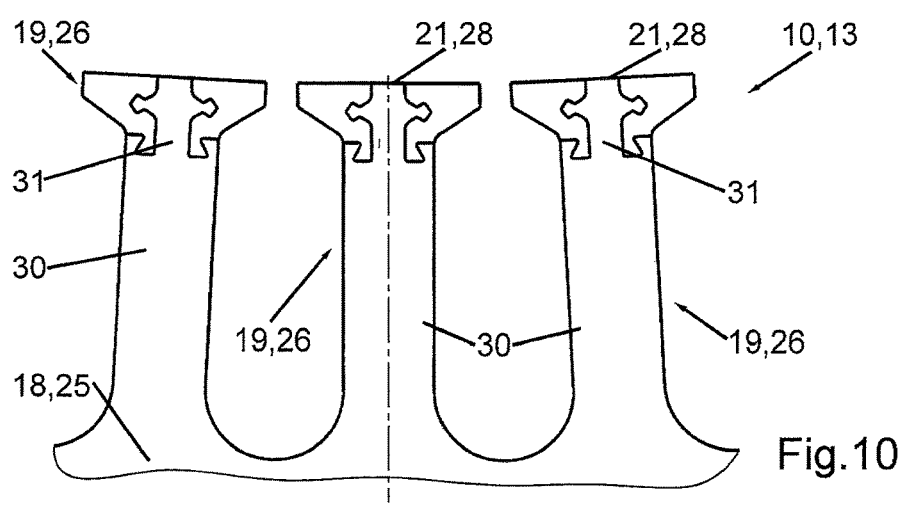

Each of FIGS. 8 to 10 schematically shows a modified embodiment of a sheet metal part, wherein this can be either a first sheet metal part 10 or a second sheet metal part 13. The teeth 19, 26 in these exemplary embodiments each have at least one tooth head segment 40, which is produced from a material different from that forming the rest of the part of the tooth, and in accordance with the example is produced from the first material. The rest of the part of the tooth, apart from the at least one tooth head segment 40, consists of the second material in accordance with the example.

In the exemplary embodiment according to FIG. 8, the tooth head 30 is formed on the whole by the tooth head segment 40 and is connected to the tooth stem 30 at a connection point 41.

By contrast, the tooth head 31 can also comprise two tooth head segments 40. The two tooth head segments 40 are arranged at a distance from one another in the peripheral direction U (in the case of a sheet metal part for an electrical machine operating in a rotary manner) or in the direction of movement V of the rotor (in the case of a sheet metal part for an electrical machine operating in a translatory manner), but by contrast could also contact one another at the end edge 21, 28. They form the corresponding end portions of a tooth head 31 as considered in the peripheral direction U or in the direction of movement V of the rotor. Each tooth segment 40 therefore forms part of the end edge 21 of a first tooth 19 or an end edge 28 of a second tooth 26. As in the exemplary embodiment according to FIG. 8, each tooth head segment 40 is connected at a connection point 41 to the adjacent portion of the relevant first tooth 19 or second tooth 26.

In the exemplary embodiment according to FIGS. 8 and 9, an integrally bonded connection is provided at a corresponding connection point 41 by welding, laser welding, adhesive bonding, combined stamping and lamination, or the like. Additionally or alternatively to this integrally bonded connection, a form-fitting and/or frictionally engaged connection can also be provided at each connection point 41. For this purpose, the course of the connection point 41 can be selected such that protrusions having extensions and associated recesses with undercuts, similarly to puzzle pieces or a dovetail connection, are created. Such connecting parts 41 are illustrated schematically in FIG. 10. The tooth head segments 40 can in this way also be connected to the rest of the part of the relevant tooth 19 or 26 in a form-fitting and/or frictionally engaged manner, additionally or alternatively to an integrally bonded connection.

In a further modification of the exemplary embodiments according to FIGS. 9 and 10 it can be sufficient to form just one of the two end portions of a tooth head 31 by a tooth head segment 40. The end portion of each tooth head 31 arranged opposite in the peripheral direction U can be produced from the material of which the rest of the part of the relevant tooth 19 or 26 also consists. This variant is advantageous when the rotor has a primary direction of movement relative to the stator or even exclusively a single direction of movement. The tooth head segments 14 made of a material having a higher saturation magnetisation are required only in one end portion of the tooth head 31, depending on the direction of movement The inner sheet metal parts 10*i* have a first thickness d1. The thickness of the sheet metal parts 10, 13 is measured in the stacking direction A. When measuring the thickness, recesses and protrusions serving for the fastening or connection of sheet metal parts 10, 13 are not taken into consideration. The thickness of a sheet metal part 10, 13 corresponds to the thickness of the starting material from which the sheet metal part 10, 13 is produced. Coatings arranged between the sheet metal parts 10, 13 in order to electrically insulate the sheet metal parts 10, 13 from one another are also not taken into consideration here.

In accordance with the example, all second sheet metal parts 13 have a second thickness d2, which can correspond to the first thickness d1 or can be different therefrom. The outer sheet metal parts 10*a* of the first sheet metal part assemblies 15 each have a third thickness d3. The third thickness d3 is preferably greater than the first thickness d1 and/or the second thickness d2.

Figure 11:
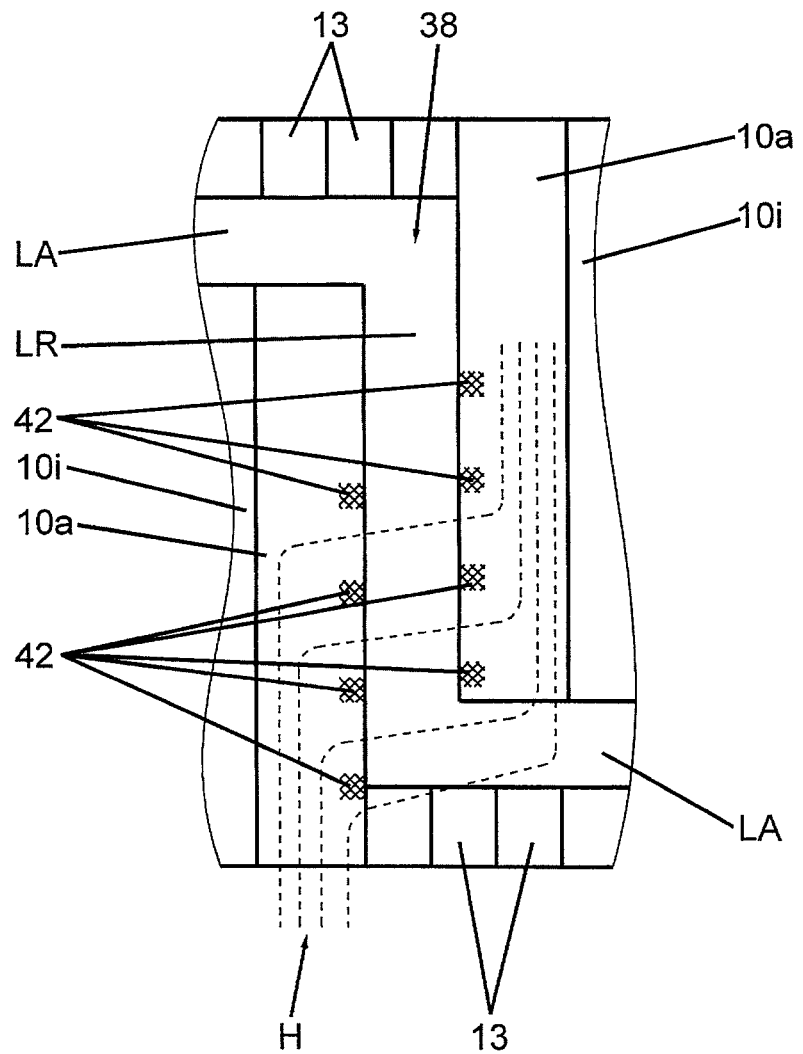
FIG. 11 shows a schematic illustration, similar to a block diagram, of areas of teeth of two first sheet metal parts by influence of heat.

Two outer sheet metal parts 10*a* are arranged facing one another in the stacking direction A at each step 38. Magnetic field lines H penetrate the radial portion LR therebetween of the air gap L (FIG. 11). When these outer sheet metal parts 10*a* are produced from a first material and/or have another, and in particular a greater thickness (third thickness d3), the saturation magnetisation is reached less quickly, even with a large magnetic flux. By way of example, in the case of an electric motor, a greater magnetic flux and consequently a higher torque can therefore be achieved by means of a higher current.

As illustrated in FIGS. 6 and 7, a laminated core 14 can comprise a first sheet metal part assembly 35 at its two axial ends. The outer sheet metal parts 10*a* delimiting the laminated core 14 here can be formed in this embodiment similarly to the inner sheet metal parts 10*i* adjacent thereto. The production of the outer sheet metal parts 10*a* from a first material and/or the provision of a third thickness d3 of the outer sheet metal parts 10*a* can be limited to the outer sheet metal parts 10*a* which are arranged at a step 38 and consequently define a radial portion LR of the air gap L.

As explained, an arrangement formed of a plurality of thin sheet metal parts which are not electrically insulated with respect to one another can be used instead of an integral, thicker sheet metal part.

A detail from FIG. 7 in the region of a step 38 is illustrated in FIG. 11 in a heavily schematic manner. The arrangement corresponds to that explained in conjunction with FIGS. 5 to 7, and therefore reference can be made to the description above. In FIG. 11 a structural alteration 42 at specific points of a sheet metal part, and in accordance with the example the outer sheet metal parts 10*a*, is illustrated in a heavily schematic manner. Such structural alterations 42 can be expedient in the area of sheet metal parts 10, 13 which border the air gap L. In accordance with the example, the structural alterations 42 have been made at a number of points in the area of the side faces of the outer sheet metal parts 10*a* bordering a first air gap portion LR. Due to the structural alterations 42, the Weiss domains in the area of the structural alteration 42 can be modified in terms of their magnetic properties. In the area of the structural alterations 42, the entry and exit of magnetic field lines H, which are indicated merely heavily schematically in a dashed manner in FIG. 11, can thus be avoided or reduced. With the aid of these structural alterations 42, it is thus possible to influence and preferably homogenise the magnetic flux density within the sheet metal part in question, and in accordance with the example within the outer sheet metal parts 10*a*.

The structural alterations 42 can be created by way of example by an influence of heat, preferably by tempering the material. In order to achieve the structural alteration, a laser, an electron beam or another suitable energy or heat source can be used, for example. The use of a laser or an electron beam has the advantage that the heat can also be introduced into small areas in a very targeted manner.

The production of the first sheet metal parts 10 and of the second sheet metal parts 13 is performed by separating the desired sheet metal part contours from a corresponding starting sheet metal. When a sheet metal part 10, 13 consists of a uniform material, the entire sheet metal part 10, 13 can be produced integrally by separation from the starting sheet metal. If, as is illustrated in FIGS. 8 to 10, a sheet metal part 10, 13 or the first teeth 19 and/or the second teeth 26 consist of a number of different materials, the corresponding segments are separated from the starting metal sheet separately and are then connected to one another at the connection points 41.

The invention relates to a laminated core 14. A laminated core 14 can be contained in a rotor 11 and/or in a stator 15 of an electrical machine 12. The laminated core 14 comprises at least one first sheet metal part assembly 35 and at least one second sheet metal part assembly 36. The first sheet metal part assembly 35 is formed by stacking a plurality of first sheet metal parts 10. The second sheet metal part assembly 36 is formed by stacking a plurality of second sheet metal parts 13. The two sheet metal part assemblies 35, 36 are arranged alternately lying against one another in a stacking direction A. Each first sheet metal part 10 has first teeth which project from a connecting part 18 at a right angle relative to the stacking direction A and end at a free end 20. Accordingly, each second sheet metal part 13 has second teeth 26 which project from a second connecting part 25 at a right angle relative to the stacking direction A and end at a free end 27. The free ends 20 of the first teeth 19 have a first distance R1 from a common reference axis or reference plane which is different from the second distance R2 of the free ends 27 of the second teeth 26 from the common reference axis or reference plane. A step 38 is therefore formed in the stacking direction A between a first sheet metal part assembly 35 and a second sheet metal part assembly 36 that lie against each other. In this way, it is possible to mesh the rotor 11 with an associated stator 15 and to increase the air gap L defined between them without increasing the axial dimension of the laminated cores 14.

LIST OF REFERENCE SIGNS 10 first sheet metal part
10*a* outer sheet metal part
10*i* inner sheet metal part
11 rotor
12 electrical machine
13 second sheet metal part
14 laminated core
15 stator
18 first connecting part
19 first tooth 20 free end of the first tooth
21 end edge of the first tooth
25 second connecting part
26 second tooth
27 free end of the second tooth
28 end edge of the second tooth
30 tooth stem
31 tooth head
35 first sheet metal part assembly
36 second sheet metal part assembly
37 end face
37a first face portion
37b second face portion
38 step
40 tooth head segment
41 connection point
42 structural alteration
A stacking direction
BA reference axis
BE reference plane
F free space
H magnetic field lines
L air gap
LA second air gap portion
LR first air gap portion
LN liquid nitrogen
M axis of rotation
R1 first distance
R2 second distance
U peripheral direction
direction of movement of the rotor
Z lifting direction

The invention claimed is:

1. A laminated core (14) of a stator (15) or a rotor (11), the laminated core comprising:
   first sheet metal parts (10) which each have a first connecting part (18) and a plurality of first teeth (19), wherein each first tooth (19) extends from the first connecting part (18) to a free end (20), and wherein the free ends (20) of the first teeth (19) individually define a first distance (R1) from a reference axis (BA) or a reference plane (BE) of the laminated core (14),
   second sheet metal parts (13) which each have a second connecting part (25) and a plurality of second teeth (26), wherein each second tooth (26) extends from the second connecting part (25) to a free end (27), and wherein the free ends (27) of the second teeth (26) individually define a second distance (R2) from the reference axis (BA) or the reference plane (BE),
   at least one first sheet metal part assembly (35) comprising at least one of the first sheet metal parts (10),
   at least one second sheet metal part assembly (36) comprising at least one of the second sheet metal parts (13), and
   wherein the at least one first sheet metal part assembly (35) and the at least one second sheet metal part assembly (36) are arranged alternately in a stacking direction (A)
   wherein at least some of the first sheet metal parts (10a) have a first thickness (d1), and the second sheet metal parts (13) have a second thickness (d2);
   wherein the first sheet metal part assembly (35) comprises a plurality of the first sheet metal parts (10), wherein two of the first sheet metal parts (10) form outer sheet metal parts (10a) and at least one further of the first sheet metal parts (10) forms an inner sheet metal part (10i) arranged between the two outer sheet metal parts (10a),
   the at least one inner sheet metal part (10i) has a first thickness (d1), and
   at least one of the two outer sheet metal parts (10a) has a third thickness (d3), which is greater than the first thickness (d1).

2. The laminated core according to claim 1, further comprising a plurality of first sheet metal part assemblies (35) and/or a plurality of second sheet metal part assemblies (36).

3. The laminated core according to claim 1, wherein each first sheet metal part assembly (35) comprises a plurality of first sheet metal parts (10), and/or each second sheet metal part assembly (36) comprises a plurality of second sheet metal parts (13).

4. The laminated core according to claim 1, wherein the first thickness (d1) and the second thickness (d2) are a same size.

5. The laminated core according to claim 1, wherein some of the first sheet metal parts (10) have a third thickness (d3), which is greater than the first thickness (d1).

6. The laminated core according to claim 1, further comprising at least two first sheet metal part assemblies and wherein a free space (F) is formed between two consecutive ones of the at least two first sheet metal part assemblies (35) in the stacking direction (A).

7. The laminated core according to claim 1, wherein the first connecting parts (18) and the second connecting parts (25) are closed annularly around the reference axis (BA) and the first teeth (19) and the second teeth (26) extend radially relative to the reference axis (BA).

8. The laminated core according to claim 7, wherein the first distance (R1) is greater than the second distance (R2), and the first teeth (19) and the second teeth (26) extend radially outwardly from an axis of rotation (M) from the first connecting part (18) and the second connecting part (25), respectively.

9. The laminated core according to claim 7, wherein the first distance (R1) is smaller than the second distance (R2), and the first teeth (19) and the second teeth (26) extend radially inwardly relative to an axis of rotation (M) from the first connecting part (18) and the second connecting part (25), respectively.

10. The laminated core according to claim 1, wherein the first and second connecting parts (18, 25) extend in a straight line or in a curved manner along a path of movement of the rotor (11) and the first and second teeth (19, 26) extend at a right angle relative to the reference plane (BE) from the first and second connecting parts (18, 25), respectively.

11. The laminated core according to claim 1, wherein the first sheet metal part assembly (35) and/or the second sheet metal part assembly (36) comprises at least one sheet metal part (10 or 13) made of one material and at least one other sheet metal part (10 of 13) made of another material.

12. The laminated core according to claim 1,
   wherein the at least one inner sheet metal part (10i) is made of one material and at least one of the two outer sheet metal parts (10a) is made another material.

13. An electrical machine (12) comprising a rotor (11) and a stator (15), wherein the rotor (11) and/or the stator (15) comprises a laminated core (14) according to claim 1.

14. The electrical machine according to claim 13, wherein the first teeth (19) of a first sheet metal part assembly (35) of the rotor (11) protrude into a free space (F) between two first sheet metal part assemblies (35) of the stator (15), and/or the first teeth (19) of a first sheet metal part assembly (35) of the stator (15) protrude into a free space (F) between two first sheet metal part assemblies (35) of the rotor (11).

15. The electrical machine according to claim 13, wherein a first sheet metal part assembly (35) of the stator (15), at a right angle relative to the reference axis (BA) or the reference plane (BE), faces a second sheet metal part assembly (36) of the rotor (11), and/or a first sheet metal part assembly (35) of the rotor (11), at a right angle relative to the reference axis (BA) or the reference plane (BE), faces a second sheet metal part assembly (36) of the stator (15).

16. The laminated core according to claim 1, wherein the at least one of the two outer sheet metal parts (10a) comprises at least two first sheet metal parts that are stacked together and are not electrically insulated with respect to one another.

17. A laminated core (14) of a stator (15) or a rotor (11), the laminated core comprising:
   first sheet metal parts (10) which each have a first connecting part (18) and a plurality of first teeth (19), wherein each first tooth (19) extends from the first connecting part (18) to a free end (20), and wherein the free ends (20) of the first teeth (19) individually define a first distance (R1) from a reference axis (BA) or a reference plane (BE) of the laminated core (14),
   second sheet metal parts (13) which each have a second connecting part (25) and a plurality of second teeth (26), wherein each second tooth (26) extends from the second connecting part (25) to a free end (27), and wherein the free ends (27) of the second teeth (26) individually define a second distance (R2) from the reference axis (BA) or the reference plane (BE),
   at least one first sheet metal part assembly (35) comprising at least one of the first sheet metal parts (10),
   at least one second sheet metal part assembly (36) comprising at least one of the second sheet metal parts (13), and
   wherein the at least one first sheet metal part assembly (35) and the at least one second sheet metal part assembly (36) are arranged alternately in a stacking direction (A),
   wherein the first sheet metal part assembly (35) comprises a plurality of the first sheet metal parts (10), wherein at least two of the first sheet metal parts (10) form outer sheet metal parts (10a) and at least one further of the first sheet metal parts (10) forms an inner sheet metal part (10i) arranged between the at least two outer sheet metal parts (10a),
   the at least one inner sheet metal part (10i) has a first thickness (d1), and
   at least one of the two outer sheet metal parts (10a) has a second thickness (d3), which is greater than the first thickness (d1), the at least one outer sheet metal part being formed from at least two first sheet metal parts stacked together without electrical insulation therebetween.

* * * * *